US006454946B1

(12) United States Patent
DeFrees

(10) Patent No.: US 6,454,946 B1
(45) Date of Patent: *Sep. 24, 2002

(54) CARBOHYDRATE PURIFICATION USING ULTRAFILTRATION, REVERSE OSMOSIS AND NANOFILTRATION

(75) Inventor: Shawn DeFrees, San Marcos, CA (US)

(73) Assignee: Neose Technologies, Inc., Horsham, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,775

(22) Filed: Oct. 9, 1997

Related U.S. Application Data

(60) Provisional application No. 60/028,226, filed on Oct. 10, 1996.

(51) Int. Cl.⁷ .............................................. B01D 61/00
(52) U.S. Cl. ....................... 210/653; 210/651; 210/652; 210/649; 127/34; 127/42; 127/53
(58) Field of Search .............................. 426/330.5, 490; 127/34, 53, 42; 210/651, 652, 653

(56) References Cited

U.S. PATENT DOCUMENTS

| | | | |
|---|---|---|---|
| 4,230,463 A | 10/1980 | Henis et al. ..................... | 95/47 |
| 4,259,183 A | 3/1981 | Cadotte ........................ | 210/654 |
| 4,562,021 A | 12/1985 | Alary et al. ................... | 264/43 |
| 4,692,354 A | 9/1987 | Asaeda et al. ................ | 427/244 |
| 4,741,823 A | 5/1988 | Olsen et al. ................. | 210/96.2 |
| 4,806,244 A | 2/1989 | Guilhem ....................... | 210/638 |
| 4,839,037 A | 6/1989 | Bertelsen et al. ............. | 210/97 |
| 4,956,458 A | 9/1990 | Luo et al. .................... | 536/112 |
| 5,164,374 A | 11/1992 | Rademacher et al. ......... | 514/23 |
| 5,233,033 A | 8/1993 | Koketsu et al. .............. | 536/124 |
| 5,254,174 A | * 10/1993 | Hansen et al. ................ | 127/34 |
| 5,330,975 A | 7/1994 | Isoda et al. .................. | 514/25 |
| 5,352,670 A | 10/1994 | Venot et al. .................. | 514/54 |
| 5,374,541 A | 12/1994 | Wong .......................... | 435/74 |
| 5,403,604 A | 4/1995 | Black et al. ............. | 426/330.5 |
| 5,454,952 A | 10/1995 | Brewer ....................... | 210/651 |
| 5,501,797 A | 3/1996 | Meindersma et al. ....... | 210/651 |
| 5,876,980 A | 3/1999 | DeFrees et al. ............... | 435/97 |

FOREIGN PATENT DOCUMENTS

| | | | |
|---|---|---|---|
| EP | 0 452 238 A2 | 10/1991 | ............ C13K/1/00 |
| EP | 0 577 580 A | 1/1994 | ............ C12P/19/26 |
| WO | WO95/02683 | 1/1995 | |
| WO | PCT/US95/12160 | 9/1995 | |
| WO | WO 96 32491 | 10/1996 | ............ C12P/19/18 |

OTHER PUBLICATIONS

Patent Abstracts of Japan, Pub. No. 03133387, published Jun. 6, 1991, application No. 01273153, dated Oct. 19, 1989, applicant Nichiden Kagaku KK, inventor Endo Yasuo, International Class C12P 19/14 B01D 61/02, entitled Production of Maltooligosaccharide.

Patent Abstracts of Japan Pub. No. 05168490, published Jul. 2, 1993, application No. 03339080, dated Dec. 20, 1991, applicant Fushimi Seiyakushiyo KK, inventor Tada Hide, International Class C12P 19/14 A01N 43/16, entitled Production of Physilogically Active Pectin Oligomer and Its Use.

Patent Abstracts of Japan, Pub. No. 04108395, published Apr. 9, 1992, application No. 02224222, dated Aug. 28, 1990, applicant Higeta Shoyu KK, inventor Hasegawa Kaname, International Class C12P 19/26, C07H 5/06 C08B 37/00 C12P 19/04, entitled Production of Galactosamino–O-ligosaccharide.

Y.K. Guu et al., "Nanofiltration Concentration Effect on the Efficacy of Lactose Crystallization," *Journal of Food Science* (1992) 57(3): 735–739.

Sales brochure, *Osmo Membrane Systems* (1985/1989) Osmonics, Inc., Minnetonka, MN.

*Pure Water Handbook* (1991) Osmonics, Inc., Minnetonka, MN.

K.H. Valkonen et al., *FEMS Immunology and Medical Microbiology* (1993) 7: 29–37.

M.J. Polley et al. *Proc. Natl. Acad. Sci., USA* (1991) 88: 6224–6228.

M.L. Phillips et al. *Science* (1990) 250: 1130–1132.

Y. Ito et al. *Pure & Appl. Chem.* (1993) 65(4) : 753–762.

P. Ericksson *Environmental Progress* (Feb. 1988) 7(1) : 58–62.

L.P. Raman et al. *Chemical Engineering Progress* (Mar. 1994) 68–74.

R. Rautenbach et al. *Desalination* (1990) 77: 73–84.

\* cited by examiner

*Primary Examiner*—James O. Wilson
*Assistant Examiner*—Howard V Owens, Jr.
(74) *Attorney, Agent, or Firm*—Townsend and Townsend and Crew LLP

(57) ABSTRACT

The invention provides methods for purifying carbohydrates, including oligosaccharides, nucleotide sugars, and related compounds, by use of ultrafiltration, nanofiltration and/or reverse osmosis. The carbohydrates are purified away from undesired contaminants such as compounds present in reaction mixtures following enzymatic synthesis or degradation of oligosaccharides.

11 Claims, No Drawings

CARBOHYDRATE PURIFICATION USING ULTRAFILTRATION, REVERSE OSMOSIS AND NANOFILTRATION

CROSS-REFERENCE TO RELATED APPLICATIONS

This is a continuation-in-part of United States Provisional Application No. 60/028,226, filed Oct. 10, 1996, the disclosure of which is incorporated by reference.

FIELD OF THE INVENTION

The present invention relates to the synthesis of oligosaccharides. In particular, it relates to improved methods for purifying oligosaccharides using ultrafiltration, nanofiltration and/or reverse osmosis.

BACKGROUND OF THE INVENTION

Increased understanding of the role of carbohydrates as recognition elements on the surface of cells has led to increased interest in the production of carbohydrate molecules of defined structure. For instance, compounds comprising the oligosaccharide moiety, sialyl lactose, have been of interest as neutralizers for enterotoxins from bacteria such as *Vibrio cholerae, Escherichia coli*, and Salmonella (see, e.g., U.S. Pat. No. 5,330,975). Sialyl lactose has also been investigated for the treatment of arthritis and related autoimmune diseases. In particular, sialyl lactose is thought to inhibit or disrupt the degree of occupancy of the Fc carbohydrate binding site on IgG, and thus prevent the formation of immune complexes (see, U.S. Pat. 5,164,374). Recently, sialyl-α(2,3)galactosides, sialyl lactose and sialyl lactosamine have been proposed for the treatment of ulcers, and Phase I clinical trials have begun for the use of the former compound in this capacity. See, Balkonen et al., *FEMS Immunology and Medical Microbiology* 7:29 (1993) and Bio World Today, p. 5, Apr. 4, 1995. As another example, compounds comprising the sialyl Lewis ligands, sialyl Lewis$^x$ and sialyl Lewis$^a$ are present in leukocyte and non-leukocyte cell lines that bind to receptors such as the ELAM-1 and GMP 140 receptors. Polley et al., *Proc. Natl. Acad. Sci., USA*, 88:6224 (1991) and Phillips et al., *Science*, 250:1130 (1990), see, also, U.S. Ser. No. 08/063,181.

Because of interest in making desired carbohydrate structures, glycosyltransferases and their role in enzyme-catalyzed synthesis of carbohydrates are presently being extensively studied. The use of glycosyltransferases for enzymatic synthesis of carbohydrate offers advantages over chemical methods due to the virtually complete stereoselectivity and linkage specificity offered by the enzymes (Ito et al., *Pure Appl. Chem.*, 65:753 (1993) U.S. Pat. Nos. 5,352, 670, and 5,374,541). Consequently, glycosyltransferases are increasingly used as enzymatic catalysts in synthesis of a number of carbohydrates used for therapeutic and other purposes.

Carbohydrate compounds produced by enzymatic synthesis or by other methods are often obtained in the form of complex mixtures that include not only the desired compound but also contaminants such as unreacted sugars, salts, pyruvate, phosphate, PEP, nucleosides, nucleotides, and proteins, among others. The presence of these contaminants is undesirable for many applications for which the carbohydrate compounds are useful. Previously used methods for purifying oligosaccharides, such as chromatography, i.e., ion exchange and size exclusion chromatography, have several disadvantages. For example, chromatographic purification methods are not amenable to large-scale purifications, thus precluding their use for commercial production of saccharides. Moreover, chromatographic purification methods are expensive. Therefore, a need exists for purification methods that are faster, more efficient, and less expensive than previously used methods. The present invention fulfills this and other needs.

BACKGROUND ART

A method for using a combination of membranes to remove undesirable impurities from a sugar-containing solution, especially molasses-forming ions which inhibit sugar crystallization is described in U.S. Pat. No. 5,454,952. The method, which involves ultrafiltration followed by nanofiltration, is described as being useful for improving the recovery of crystalline sugar from sugar cane or sugar beet solutions.

U.S. Pat. No. 5,403,604 describes the removal of fruit juice sugars from fruit juice by nanofiltration to obtain a retentate having a high level of sugars and a permeate having a lower level of sugars.

U.S. Pat. No. 5,254,174 describes the use of chromatography and/or nanofiltration to purify inulide compounds of formula $GF_n$ (where G is glucose and F is fructose) by removing salts and glucose, fructose, and sucrose from a juice or syrup containing the inulide compounds.

U.S. Pat. No. 4,956,458 describes the use of reverse osmosis to remove from polydextrose, which is a randomly cross-linked glucan polymer produced trough the acid-catalyzed condensation of glucose, most of the off-flavor constituents such as anhydroglucose and furaldehyde derivatives polydextrose.

U.S. Pat. No. 4,806,244 describes the use of a combined membrane and sorption system in which sulfate is removed from water by nanofiltration, after which the nitrate, which passed through the membrane, was removed from the permeate by absorption to an ion exchange resin.

SUMMARY OF THE INVENTION

The present invention provides methods of purifying a carbohydrate compound from a feed solution containing a contaminant. The methods involve contacting the feed solution with a nanofiltration or reverse osmosis membrane under conditions such that the membrane retains the desired carbohydrate compound while a majority of the contaminant passes through the membrane. The invention provides methods for purifying carbohydrate compounds such as sialyl lactosides, sialic acid, lacto-N-neotetraose (LNnT) and GlcNAcβ1,3Galβ1,4Glc (LNT-2), NeuAcα(2→3)Galβ(1→4)(Fuc$_\alpha$1→3)Glc(R$^1$) β1-OR$^2$, wherein R$^1$ is OH or NAc; R$^2$ is a hydrogen, an alkoxy, a saccharide, an oligosaccharide or an aglycon group having at least one carbon atom; and Galα(1→3)Galβ(1Δ4)Glc(R$^1$) βO—R$^3$, wherein R$^1$ is OH or NAc; R$^3$ is —(CH$_2$)$_n$—COX, with X=OH, OR$^4$, —NHNH$_2$, R$^4$ being a hydrogen, a saccharide, an oligosaccharide or an aglycon group having at least one carbon atom, and n=an integer from 2 to 18.

Also provided are methods for purifying carbohydrate compounds having a formula NeuAcα(2→3)Galβ(1→4) GlcN(R$^1$)β—OR$^2$, NeuAcα(2→3)Galβ(1→4)GlcN(R$^1$)β (1→3)Galβ—OR$^2$, NeuAcα(2→3)Galβ(1→4) (Fuc$_\alpha$1→3) GlcN(R$^1$)β—OR$^2$, or NeuAcα(2→3)Galβ(1→4) (Fucα1→3)GlcN(R$^1$)β(1→3)Galβ—OR$^2$, wherein R$^1$ is alkyl or acyl from 1–18 carbons, 5,6,7,8-tetrahydro-2-naphthamido; benzamido; 2-naphthamido; 4-aminobenzamido; or 4-nitrobenzamido, and R$^2$ is a hydrogen, a saccharide, an oligosaccharide or an aglycon group having at least one carbon atom.

In another embodiment, the invention provides methods of purifying a carbohydrate compound from a feed solution comprising a reaction mixture used to synthesize the carbohydrate compound. The synthesis can be enzymatic or chemical, or a combination thereof. The methods involve removing any proteins present in the feed solution by contacting the feed solution with an ultrafiltration membrane so that proteins are retained the membrane while the carbohydrate compound passes through the membrane as a permeate. The permeate from the ultrafiltration step is then contacted with a nanofiltration or reverse osmosis membrane under conditions such that the nanofiltration or reverse osmosis membrane retains the carbohydrate compound while a majority of an undesired contaminant passes through the membrane.

Another embodiment of the invention provides methods for purifying nucleotides, nucleosides, and nucleotide sugars by contacting a feed solution containing the nucleotide or related compound with a nanofiltration or reverse osmosis membrane under conditions such that the membrane retains the nucleotide or related compound while a majority of the contaminant passes through the membrane.

The present invention also provides methods for removing one or more contaminants from a solution that contains a carbohydrate of interest. The methods involve contacting the solution with a first side of a semipermeable membrane having rejection coefficients so as to retain the carbohydrate while allowing the contaminant to pass through the membrane. The membrane is selected from the group consisting of an ultrafiltration membrane, a nanofiltration membrane, and a reverse osmosis membrane, depending on the size and charge of the carbohydrate of interest relative to those of the contaminants. The membrane separates a feed solution containing a carbohydrate into a retentate portion and a permeate portion. If the rejection coefficient of the membrane is greater for the carbohydrate than for the contaminant, the retentate portion will have a lower concentration of the contaminant relative to the contaminant concentration in the feed solution, and generally also a higher ratio of the carbohydrate to the undesired contaminant. Conversely, a membrane having a rejection coefficient for the carbohydrate that is lesser than that for the contaminant will effect a separation wherein the concentration of the contaminant is lower in the permeate than in the feed solution, and the permeate will have a higher ratio of carbohydrate to contaminant than the feed solution. If desired, the fraction containing the carbohydrate can be recycled through the membrane system for further purification.

Examples of contaminants that can be removed from solutions containing the compound of interest using the methods of the invention include, but are not limited to, unreacted sugars, inorganic ions, pyruvate, phosphate, phosphoenolpyruvate, and proteins.

DESCRIPTION OF THE PREFERRED EMBODIMENTS

Definitions

The following abbreviations are used herein:

Ara = arabinosyl;
Fru = fructosyl;
Fuc = fucosyl;
Gal = galactsyl;
GalNAc = N-acetylgalactosaminyl;
Glc = glucosyl;
GlcNAc = N-acetylglucosaminyl;
Man = mannosyl; and
NeuAc = sialyl (N-acetylneuraminyl).

The term "carbohydrate" encompasses chemical compounds having the general formula $(CH_2O)_n$, and includes monosaccharides, disaccharides, oligosaccharides, and polysaccharides. The term "oligo," as used herein, refers to a polymeric molecule consisting of 2 to approximately 10 residues, for example, amino acids (oligopeptide), monosaccharides (oligosaccharide), and nucleic acids (oligonucleotide). The term "poly" refers to a polymeric molecule comprising greater than about 10 residues.

Oligosaccharides are considered to have a reducing end and a non-reducing end, whether or not the saccharide at the reducing end is in fact a reducing sugar. In accordance with accepted nomenclature, oligosaccharides are depicted herein with the non-reducing end on the left and the reducing end on the right.

All oligosaccharides described herein are described with the name or abbreviation for the non-reducing saccharide (e.g., Gal), followed by the configuration of the glycosidic bond (α or β), the ring bond, the ring position of the reducing saccharide involved in the bond, and then the name or abbreviation of the reducing saccharide (e.g., GlcNAc). The linkage between two sugars may be expressed, for example, as 2,3, 2→3, or (2,3).

A compound is "substantially purified" from an undesired component in a solution if the concentration of the undesired component after purification is no greater than about 40% of the concentration of the component prior to purification. Preferably, the post-purification concentration of the undesired component will be less than about 20% by weight, and more preferably less than about 10%, of the pre-purification concentration.

The term "pharmaceutically pure," as used herein, refers to a compound that is sufficiently purified from undesired contaminants that the compound is suitable for administration as a pharmaceutical agent. Preferably, the compound is purified such that the undesired contaminant is present after purification in an amount that is about 5% by weight or less of the pre-purification concentration of the contaminant in the feed solution. More preferably, the post-purification concentration of the contaminant is about 1% or less of the pre-purification contaminant concentration, and most preferably about 0.5% or less of the pre-purification concentration of contaminant.

A "feed solution" refers to any solution that contains a compound to be purified. For example, a reaction mixture used to synthesize an oligosaccharide can be used as a feed solution from which the desired reaction product is purified using the methods of the invention.

Embodiments of the Invention

The present invention provides methods for rapidly and efficiently purifying specific carbohydrate and oligosaccharide structures to a high degree of purity using semipermeable membranes such as reverse osmosis and/or nanofiltration membranes. The methods are particularly useful for separating desired oligosaccharide compounds from reactants and other contaminants that remain in a reaction mixture after synthesis or breakdown of the oligosaccharides. For example, the invention provides methods for separating oligosaccharides from enzymes and/or other components of reaction mixtures used for enzymatic synthesis or enzymatic degradation of oligosaccharides, nucleotide sugars, glycolipids, liposaccharides, nucleotides, nucleosides, and other saccharide-containing compounds. Also provided are methods for removing salts, sugars and other components from feed solutions using ultrafiltration, nanofiltration or reverse osmosis. Using these techniques, the saccharides (e.g., sialyl lactose, $SLe^x$, and many others) can be produced at up to essentially 100% purity. Moreover, the purification methods of the invention are more efficient, rapid, and amenable to large-scale purifications than previously known carbohydrate purification methods.

Often, a desired purification can be effected in a single step; additional purification steps such as crystallization and the like are generally not required. Accordingly, the invention provides single-step methods for purifying saccharide-containing compounds.

To purify saccharides according to the invention, a membrane is selected that is appropriate for separating the desired carbohydrate from the undesired components of the solution from which the carbohydrate is to be purified. The goal in selecting a membrane is to optimize for a particular application the molecular weight cutoff (MWCO), membrane composition, permeability, and rejection characteristics, that is, the membrane's total capacity to retain specific molecules while allowing salts and other, generally smaller or opposite charged molecules, to pass through. The percent retention of a component i ($R_i$) is given by the formula $R_i=(1-C_{ip}/C_{ir})\times 100\%$, wherein $C_{ip}$ is the concentration of component i in the permeate and $C_{ir}$ is the concentration of component i in the retentate, both expressed in weight percent. The percent retention of a component is also called the retention characteristic or the membrane rejection coefficient.

For effective separation, a membrane is chosen that has a high rejection ratio for the saccharide of interest relative to the rejection ratio for compounds from which separation is desired. If a membrane has a high rejection ratio for a first compound relative to a second compound, the concentration of the first compound in the permeate solution which passes through the membrane is decreased relative to that of the second compound. Conversely, the concentration of the first compound increases relative to the concentration of the second compound in the retentate. If a membrane does not reject a compound, the concentration of the compound in both the permeate and the reject portions will remain essentially the same as in the feed solution. It is also possible for a membrane to have a negative rejection rate for a compound if the compound's concentration in the permeate becomes greater than the compound's concentration in the feed solution. A general review of membrane technology is found in "Membranes and Membrane Separation Processes," in Ullmann's *Encyclopedia of Industrial Chemistry* (VCH, 1990); see also, Noble and Stern, *Membrane Separations Technology: Principles and Applications* (Elsevier, 1995).

As a starting point, one will generally choose a membrane having a molecular weight cut-off (MWCO, which is often related to membrane pore size) that is expected to retain the desired compounds while allowing an undesired compound present in the feed stream to pass through the membrane. The desired MWCO is generally less than the molecular weight of the compound being purified, and is typically greater than the molecular weight of the undesired contaminant that is to be removed from the solution containing the compound being purified. For example, to purify a compound having a molecular weight of 200 Da, one would choose a membrane that has a MWCO of less than about 200 Da. A membrane with a MWCO of 100 Da, for example, would also be a suitable candidate. The membranes that find use in the present invention are classified in part on the basis of their MWCO as ultrafiltration (UF) membranes, nanofiltration (NF) membranes, or reverse osmosis (RO) membranes, depending on the desired separation. For purposes of this invention, UF, NF, and RO membranes are classified as defined in the *Pure Water Handbook*, Osmonics, Inc. (Minnetonka Minn.). RO membranes typically have a nominal MWCO of less than about 200 Da and reject most ions, NF membranes generally have a nominal MWCO of between about 150 Da and about 5 kDa, and UF membranes generally have a nominal MWCO of between about 1 kDa and about 300 kDa (these MWCO ranges assume a saccharide-like molecule).

A second parameter that is considered in choosing an appropriate membrane for a particular separation is the polymer type of the membrane. The membranes used in each zone are made of conventional membrane material whether inorganic, organic, or mixed inorganic and organic. Typical inorganic materials include glasses, ceramics, cermets, metals and the like. Ceramic membranes, which are preferred for the UF zone, may be made, for example, as described in U.S. Pat. Nos. 4,692,354 to Asaeda et al, 4,562,021 to Alary et al., and others. The organic materials which are preferred for the NF and RO zones, are typically polymers, whether isotropic, or anisotropic with a thin layer or "skin" on either the bore side or the shell side of the fibers. Preferred materials for fibers are polyamides, polybenzamides, polysulfones (including sulfonated polysulfone and sulfonated polyether sulfone, among others), polystyrenes, including styrene-containing copolymers such as acrylonitrile-styrene, butadiene-styrene and styrene-vinylbenzylhalide copolymers, polycarbonates, cellulosic polymers including cellulose acetate, polypropylene, poly (vinyl chloride), poly(ethylene terephthalate), polyvinyl alcohol, fluorocarbons, and the like, such as those disclosed in U.S. Pat. Nos. 4,230,463, 4,806,244, and 4,259,183. The NF and RO membranes often consist of a porous support substrate in addition to the polymeric discrimination layer.

Of particular importance in selecting a suitable membrane composition is the membrane surface charge. Within the required MWCO range, a membrane is selected that has a surface charge that is appropriate for the ionic charge of the carbohydrate and that of the contaminants. While MWCO for a particular membrane is generally invariable, changing the pH of the feed solution can affect separation properties of a membrane by altering the membrane surface charge. For example, a membrane that has a net negative surface charge at neutral pH can be adjusted to have a net neutral charge simply by lowering the pH of the solution. An additional effect of adjusting solution pH is to modulate the ionic charge on the contaminants and on the carbohydrate of interest. Therefore, by choosing a suitable membrane polymer type and pH, one can obtain a system in which both the contaminant and the membrane are neutral, facilitating pass-through of the contaminant. If, for instance, a contaminant is negatively charged at neutral pH, it is often desirable to lower the pH of the feed solution to protonate the contaminant. For example, removal of phosphate is facilitated by lowering the pH of the solution to about 3, which protonates the phosphate anion, allowing passage through a membrane. As shown in Example 5, a decrease in pH from 7.5 to 3.0 decreases the percentage of GlcNAc passing through a polyamide membrane such as an Osmonics MX07 in thirty minutes from 70% to 28%, while increasing the pass percentage of phosphate from 10% to 46% (see, Example 6, Table 5 for additional examples of the effect of pH change on passage rate of other compounds through various nanofiltration membranes). For purification of an anionic carbohydrate, the pH will generally between about pH 1 and about pH 7. Conversely, if contaminant has a positive surface charge, the pH of the feed solution can be adjusted to between about pH 7 and about pH 14. For example, increasing the pH of a solution containing a contaminant having an amino group ($-NH_3^+$) will make the amino group neutral, thus facilitating its passage through the membrane. Thus, one aspect of the invention involves modulating a separation by adjusting the pH of a solution in contact with the membrane; this can change the ionic charge of a contaminant and can also affect the surface charge of the membrane, thus facilitating purification if the desired carbohydrate. Of course, the manufacturer's instructions must be followed as to acceptable pH range for a particular membrane to avoid damage to the membrane.

For some applications, a mixture is first subjected to nanofiltration or reverse osmosis at one pH, after which the retentate containing the saccharide of interest is adjusted to a different pH and subjected to an additional round of membrane purification. For example, filtration of a reaction mixture used to synthesize sialyl lactose through an Osmonics MX07 membrane (a nanofiltration membrane having a MWCO of about 500 Da) at pH 3.0 will retain the sialyl lactose and remove most phosphate, pyruvate, salt and manganese from the solution, while also removing some of the GlcNAc, lactose, and sialic acid. Further recirculation through the MX07 membrane after adjusting the pH of the retentate to 7.4 will remove most of the remaining phosphate, all of the pyruvate, all of the lactose, some of the sialic acid, and substantial amounts of the remaining manganese.

If a saccharide is to be purified from a mixture that contains proteins, such as enzymes used to synthesize a desired oligosaccharide or nucleotide sugar, it is often desirable to remove the proteins as a first step of the purification procedure. For a saccharide that is smaller than the proteins, this separation is accomplished by choosing a membrane that has an MWCO which is less than the molecular mass of the protein or other macromolecule to be removed from the solution, but is greater than the molecular mass of the oligosaccharide being purified (i.e., the rejection ratio in this case is higher for the protein than for the desired saccharide). Proteins and other macromolecules that have a molecular mass greater than the MWCO will thus be rejected by the membrane, while the saccharide will pass through the membrane. Conversely, if an oligosaccharide or nucleotide sugar is to be purified from proteins that are smaller than the oligosaccharide or nucleotide sugar, a membrane is used that has a MWCO that is larger than the molecular mass of the protein but smaller than that of the oligosaccharide or nucleotide sugar. Generally, separation of proteins from carbohydrates will employ membranes that are commonly referred to as ultrafiltration (UF) membranes. UF membranes that are suitable for use in the methods of the invention are available from several commercial manufacturers, including Millipore Corp. (Bedford, Mass.), Osmonics, Inc. (Minnetonka, Minn.), Filmtec (Minneapolis, Minn., UOP, Desalination Systems, Advanced Membrane Technologies, and Nitto.

The invention also provides methods for removing salts and other low molecular weight components from a mixture containing a saccharide of interest by using a nanofiltration (NF) or a reverse osmosis (RO) membrane. Nanofiltration membranes are a class of membranes for which separation is based both on molecular weight and ionic charge. These membranes typically fall between reverse osmosis and ultrafiltration membranes in terms of the size of species that will pass through the membrane. Nanofiltration membranes typically have micropores or openings between chains in a swollen polymer network. Molecular weight cut-offs for non-ionized molecules are typically in the range from 100–20,000 Daltons. For ions of the same molecular weight, membrane rejections (retentions) will increase progressively for ionic charges of 0, 1, 2, 3 etc. for a particular membrane because of increasing charge density (see, e.g., Eriksson, P., "Nanofiltration Extends the Range of Membrane Filtration," *Environmental Progress*, 7: 58–59 (1988)). Nanofiltration is also described in *Chemical Engineering Progress*, pp. 68–74 (March 1994), Rautenbach et al., *Desalination* 77:73 (1990), and U.S. Pat. No. 4,806,244). In a typical application, saccharides of interest will be retained by the nanofiltration membrane and contaminating salts and other undesired components will pass through. A nanofiltration membrane useful in the methods of the invention will typically have a retention characteristic for the saccharide of interest of from about 40% to about 100%, preferably from about 70% to about 100%. The nanofilter membranes used in the invention can be any one of the conventional nanofilter membranes, with polyamide membranes being particularly suitable. Several commercial manufacturers, including Millipore Corp. (Bedford, Mass.), Osmonics, Inc. (Minnetonka, Minn.), Filmtec, UOP, Advanced Membrane Technologies, Desalination Systems, and Nitto, among others, distribute nanofiltration membranes that are suitable for use in the methods of the invention. For example, suitable membranes include the Osmonics MX07, YK, GH (G-10), GE (G-5), and HL membranes, among others.

Reverse osmosis (RO) membranes also allow a variety of aqueous solutes to pass through them while retaining selected molecules. Generally, osmosis refers to a process whereby a pure liquid (usually water) passes through a semipermeable membrane into a solution (usually sugar or salt and water) to dilute the solution and achieve osmotic equilibrium between the two liquids. In contrast, reverse osmosis is a pressure driven membrane process wherein the application of external pressure to the membrane system results in a reverse flux with the water molecules passing from a saline or sugar solution compartment into the pure water compartment of the membrane system. A RO membrane, which is semipermeable and non-porous, requires an aqueous feed to be pumped to it at a pressure above the osmotic pressure of the substances dissolved in the water. An RO membrane can effectively remove low molecular weight molecules (<200 Daltons) and also ions from water. Preferably, the reverse osmosis membrane will have a retention characteristic for the saccharide of interest of from about 40% to about 100%, preferably from about 70% to about 100%. Suitable RO membranes include, but are not limited to, the Filmtec BW-30, Filmtec SW-30, Filmtec SW-30HR, UOP RO membranes, Desal RO membranes, Osmonics RO membranes, Advanced Membrane Technologies RO membranes, and the Nitto RO membranes, among others. One example of a suitable RO membrane is Millipore Cat. No. CDRN500 60 (Millipore Corp., Bedford, Mass.).

The membranes used in the invention may be employed in any of the known membrane constructions. For example, the membranes can be flat, plate and frame, tubular, spiral wound, hollow fiber, and the like. In a preferred embodiment, the membrane is spiral wound. The membranes can be employed in any suitable configuration, including either a cross-flow or a depth configuration. In "cross-flow" filtration, which is preferred for ultrafiltration, nanofiltration and reverse osmosis purifications according to the invention,he "feed" or solution from which the carbohydrate of interest is to be purified flows through membrane channels, either parallel or tangential to the membrane surface, and is separated into a retentate (also called recycle or concentrate) stream and a permeate stream. To maintain an efficient membrane, the feed stream should flow, at a sufficiently high velocity, parallel to the membrane surface to create shear forces and/or turbulence to sweep away accumulating particles rejected by the membrane. Cross-flow filtration thus entails the flow of three streams—feed, permeate and retentate. In contrast, a "dead end" or "depth" filter has only two streams—feed and filtrate (or permeate). The recycle or retentate stream, which retains all the particles and large molecules rejected by the membrane, can be entirely recycled to the membrane module in which the recycle stream is generated, or can be partially removed from the system. When the methods of the invention are used to purify saccharides from lower molecular weight components, for example, the desired saccharides are contained in the retentate stream (or feed stream, for a depth filter), while the permeate stream contains the removed contaminants.

The purification methods of the invention can be further optimized by adjusting the pressure, flow rate, and temperature at which the filtration is carried out. UF, NF, and RO generally require increasing pressures above ambient to overcome the osmotic pressure of the solution being passed through the membrane. The membrane manufacturers' instructions as to maximum and recommended operating pressures can be followed, with further optimization possible by making incremental adjustments. For example, the recommended pressure for UF will generally be between about 25 and about 100 psi, for NF between about 50 psi and about 1500 psi, and for RO between about 100 and about 1500 psi. Flow rates of both the concentrate (feed solution) and the permeate can also be adjusted to optimize the desired purification. Again, the manufacturers' recommendations for a particular membrane serve as a starting point from which to begin the optimization process by making incremental adjustments. Typical flow rates for the concentrate ($P_c$) will be between about 1 and about 15 gallons per minute (GPM), and more preferably between about 3 and about 7 GPM. For the permeate, flow rates ($P_f$) of between about 0.05 GPM and about 10 GPM are typical, with flow rates between about 0.2 and about 1 GPM being preferred. The temperature at which the purification is carried out can also influence the efficiency and speed of the purification. Temperatures of between about 0 and about 100° C. are typical, with temperatures between about 20 and 40° C. being preferred for most applications. Higher temperatures can, for some membranes, result in an increase in membrane pore size, thus providing an additional parameter that one can adjust to optimize a purification.

In a preferred embodiment, the filtration is performed in a membrane purification machine which provides a means for automating control of flow rate, pressure, temperature, and other parameters that can affect purification. For example, the Osmonics 213T membrane purification machine is suitable for use in the methods of the invention, as are machines manufactured by other companies listed above.

The membranes can be readily cleaned either after use or after the permeability of the membrane diminishes. Cleaning can be effected at a slightly elevated temperature if so desired, by rinsing with water or a caustic solution. If the streams contain small amounts of enzyme, rinsing in the presence of small amounts of surfactant, for instance ULTRASIL®, might be useful. Also, one can use prefilters (100–200 $\mu$m) to protect the more expensive nanofiltration membranes. Other cleaning agents can, if desired, be used. The choice of cleaning method will depend on the membrane being cleaned, and the membrane manufacturer's instructions should be consulted. The cleaning can be accomplished with a forward flushing or a backward flushing.

The purification methods of the invention can be used alone or in combination with other methods for purifying carbohydrates. For example, an ion exchange resin can be used to remove particular ions from a mixture containing a saccharide of interest, either before or after nanofiltration/ reverse osmosis, or both before and after filtration. Ion exchange is particularly desirable if it is desired to remove ions such as phosphate and nucleotides that remain after a first round of nanofiltration or reverse osmosis. In the case of sialyl lactose synthesis as discussed above, this can be accomplished, for example, by adding an anion exchange resin such as AG1X-8 (acetate form, BioRad; see, e.g., BioRad catalog for other ion exchange resins) to a retentate that is at about pH 3.0 or lower until the phosphate concentration is reduced as desired. In this process, acetic acid is released, so one may wish to follow the ion exchange with an additional purification through the nanofiltration or reverse osmosis system. For example, one can circulate the pH 3.0 or lower solution through an Osmonics MX07 or similar membrane until the conductivity of the permeate is low and stabilized. The pH of the solution can then be raised to 7.4 with NaOH and the solution recirculated through the same membrane to remove remaining sodium acetate and salt. Cations can be removed in a similar manner; for example, to remove $Mn^{2+}$, an acidic ion exchange resin can be used, such as AG50WX8 ($H^+$) (BioRad).

The purification methods of the invention are particularly useful for purifying oligosaccharides that have been prepared using enzymatic synthesis. Enzymatic synthesis using glycosyltransferases provides a powerful method for preparing oligosaccharides; for some applications it is desirable to purify the oligosaccharide from the enzymes and other reactants in the enzymatic synthesis reaction mixture. Preferred methods for producing many oligosaccharides involve glycosyl transferase cycles, which produce at least one mole of inorganic pyrophosphate for each mole of product formed and are typically carried out in the presence of a divalent metal ion. Examples of glycosyltransferase cycles are the sialyltransferase cycles, which use one or more enzymes as well as other reactants. See, e.g., U.S. Pat. No. 5,374,541 WO 9425615 A, PCT/US96/04790, and PCT/US96/04824. For example, a reaction used for synthesis of sialylated oligosaccharides can contain a sialyltransferase, a CMP-sialic acid synthetase, a sialic acid, an acceptor for the sialyltransferase, CTP, and a soluble divalent metal cation. An exemplary α(2,3)sialyltransferase referred to as α(2,3) sialtransferase (EC 2.4.99.6) transfers sialic acid to the non-reducing terminal Gal of a Galβ1→3Glc disaccharide or glycoside. See, Van den Eijnden et al., *J. Biol. Chem.*, 256;3159 (1981), Weinstein et al., *J. Biol. Chem.*, 257:13845 (1982) and Wen et al, *J. Biol. Chem.*, 267:21011 (1992). Another exemplary α2,3-sialyltransferase (EC 2.4.99.4) transfers sialic acid to the non-reducing terminal Gal of the disaccharide or glycoside. See, Rearick et al., *J. Biol. Chem.*, 254:4444 (1979) and Gillespie et al., *J. Biol. Chem.*, 267:21004 (1992). Further exemplary enzymes include Gal-β-1 4-GlcNAcα-2,6 sialyltransferase (See, Kurosawa et al. *Eur. J. Biochem.* 219:375–381 (1994)). The reaction mixture will also contain an acceptor for the sialyltransferase, preferably having a galactosyl unit. Suitable acceptors, include, for example, Galβ1→3GalNAc, lacto-N-tetraose, Galβ1→3GlcNAc, Galβ1→3Ara, Galβ1→6GlcNAc, Galβ1→4Glc (lactose), Galβ1→4Glcβ1-OCH$_2$CH$_3$, Galβ1→4Glcβ1-OCH$_2$CH$_2$CH$_3$, Galβ1→4Glcβ1-OCH$_2$C$_6$H$_5$, Galβ1→4GlcNAc, Galβ1-OCH$_3$, melibiose, raffinose, stachyose, and lacto-N-neotetraose (LNnT). The sialic acid present in the reaction mixture can include not only sialic acid itself (5-N-acetylneuraminic acid; 5-N-acetylamino-3,5-dideoxy-D-glycero-D-galacto-2-nonulosonic acid; NeuAc, and sometimes also abbreviated AcNeu or NANA), but also 9-substituted sialic acids such as a 9-O-C$_1$-C$_6$ acyl-NeuAc like 9-O-lactyl-NeuAc or 9-O-acetyl-NeuAc, 9-deoxy-9-fluoro-NeuAc and 9-azido-9-deoxy-NeuAc. The synthesis and use of these compounds in a sialylation procedure is described in international application WO 92/16640, published Oct. 1, 1992.

In preferred embodiments the reaction medium can further comprise a CMP-sialic acid recycling system comprising at least 2 moles of phosphate donor per each mole of sialic acid, and catalytic amounts of an adenine nucleotide, a kinase capable of transferring phosphate from the phosphate donor to nucleoside diphosphates, and a nucleoside monophosphate kinase capable of transferring the terminal phosphate from a nucleoside triphosphate to CMP. For example, a suitable CMP-sialic acid regenerating system comprises cytidine monophosphate (CMP), a nucleoside triphosphate (for example adenosine triphosphate (ATP), a phosphate donor (for example, phosphoenolpyruvate or acetyl phosphate), a kinase (for example, pyruvate kinase or acetate kinase) capable of transferring phosphate from the phosphate donor to nucleoside diphosphates and a nucleoside monophosphate kinase (for example, myokinase) capable of transferring the terminal phosphate from a nucleoside triphosphate to CMP. The previously discussed α(2,3)sialyltransferase and CMP-sialic acid synthetase can also be formally viewed as part of the CMP-sialic acid regenerating system. For those embodiments in which a CMP-sialic acid recycling system is not used, the reaction medium will preferably further comprise a phosphatase.

Pyruvate is a byproduct of the sialyltransferase cycle and can be made use of in another reaction in which N-acetylmannosamine (ManNAc) and pyruvate are reacted in the presence of NeuAc aldolase (EC 4.1.3.3) to form sialic acid. Alternatively, advantage can be taken of the isomerization of GlcNAc to ManNAc, and the less expensive GlcNAc can be used as the starting material for sialic acid generation. Thus, the sialic acid can be replaced by ManNAc (or GlcNAc) and a catalytic amount of NeuAc aldolase. Although NeuAc aldolase also catalyzes the reverse reaction (NeuAc to ManNAc and pyruvate), the produced NeuAc is irreversibly incorporated into the reaction cycle via CMP-NeuAc catalyzed by CMP-sialic acid synthetase. In addition, the starting material, ManNAc, can also be made by the chemical conversion of GlcNAc using methods known in the art (see, e.g., Simon et al., *J. Am. Chem. Soc.* 110:7159 (1988). The enzymatic synthesis of sialic acid and its 9-substituted derivatives and the use of a resulting sialic acid in a different sialylating reaction scheme is disclosed in International application WO 92/16640, published on Oct. 1, 1992, and incorporated herein by reference.

When a galactosyltransferase is used for enzymatic synthesis of an oligosaccharide, the reaction medium will preferably contain, in addition to a galactosyltransferase, donor substrate, acceptor sugar and divalent metal cation, a donor substrate recycling system comprising at least 1 mole of glucose-1-phosphate per each mole of acceptor sugar, a phosphate donor, a kinase capable of transferring phosphate from the phosphate donor to nucleoside diphosphates, and a pyrophosphorylase capable of forming UDP-glucose from UTP and glucose-1-phosphate and catalytic amounts of UDP and a UDP-galactose-4-epimerase. Exemplary galactosyltransferases include α(1,3) galactosyltransferase (E.C. No. 2.4.1.151, see, e.g., Dabkowski et al., *Transplant Proc.* 25: 2921 (1993) and Yamamoto et al., *Nature* 345:229–233 (1990)) and β(1,4) galactosyltransferase (E.C. No. 2.4.1.38).

Oligosaccharides synthesized by other enzymatic methods can also be purified by the methods of the invention. For example, the methods are useful for purifying oligosaccharides produced in non-cyclic or partially cyclic reactions such as simple incubation of an activated saccharide and an appropriate acceptor molecule with a glycosyltransferase under conditions effective to transfer and covalently bond the saccharide to the acceptor molecule. Glycosyltransferases, which include those described in, e.g., U.S. Pat. No. 5,180,674, and International Patent Publication Nos. WO 93/13198 and WO 95/02683, as well the glycosyltransferases encoded by the los locus of Neisseria (see, U.S. Pat. No. 5,545,553), can be bound to a cell surface or unbound. Oligosaccharides that can be obtained using these glycosyltransferases include, for example, Galα(1→4)Galβ(1→4)Glc, GlcNAcβ(1,3)Galβ(1,4)Glc, Galβ(1→4)GlcNAcβ(1→3)Galβ(1→4)Glc, and GalNAcβ(1→3)Galβ(1→4)GlcNAcβ(1→3)Galβ(1→4)Glc, among many others.

Among the compounds that one can purify using the described methods are sialic acid and any sugar having a sialic acid moiety. These include the sialyl galactosides, including the sialyl lactosides, as well as compounds having the formula:

NeuAcα(2→3)Galβ(1→4)GlcN(R')β—OR or

NeuAcα(2→3)Galβ(1→4)GlcN(R')β(1→3)Galβ—OR

In these formulae, R' is alkyl or acyl from 1–18 carbons, 5,6,7,8-tetrahydro-2-naphthamido; benzamido; 2-naphthamido; 4-aminobenzamido; or 4-nitrobenzamido. R is a hydrogen, a alkyl $C_1$-$C_6$, a saccharide, an oligosaccharide or an aglycon group having at least one carbon atom. The term "aglycon group having at least one carbon atom" refers to a group —A—Z, in which A represents an alkylene group of from 1 to 18 carbon atoms optionally substituted with halogen, thiol, hydroxy, oxygen, sulfur, amino, imino, or alkoxy; and Z is hydrogen, —OH, —SH, —$NH_2$, —$NHR^1$, —$N(R^1)_2$, —$CO_2H$, —$CO_2R^1$, —$CONH_2$, —$CONHR^1$, —$CON(R^1)_2$, —$CONHNH_2$, or —$OR^1$ wherein each $R^1$ is independently alkyl of from 1 to 5 carbon atoms. In addition, R can be

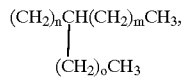

where n,m,o=1–18; $(CH_2)_n$-$R^2$ (in which n=0–18), wherein $R^2$ is a variously substituted aromatic ring, preferably, a phenyl group, being substituted with one or more alkoxy groups, preferably methoxy or $O(CH_2)_mCH_3$, (in which m=0–18), or a combination thereof. R can also be 3-(3,4,5-trimethoxyphenyl)propyl.

The present invention is also useful for purifying a variety of compounds that comprise selectin-binding carbohydrate moieties. These selectin-binding moieties have the general formula:

$R^1$Galβ1,m(Fucα1,n)GlcN$R^0$($R^2$)$_p$— in which $R^0$ is ($C_1$-$C_8$ alkyl)carbonyl, ($C_1$-$C_8$ alkoxy)carbonyl, or ($C_2$-$C_9$ alkenyloxy)carbonyl, $R^1$ is an oligosaccharide or a group having the formula

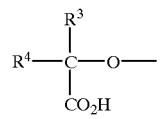

$R^3$ and $R^4$ may be the same or different and may be H, $C_1$-$C_8$ alkyl, hydroxy-($C_1$-$C_8$ alkyl), aryl-($C_1$-$C_8$ alkyl), or ($C_1$-$C_8$ alkoxy)-($C_1$-$C_8$ alkyl), substituted or unsubstituted. $R^2$ may be H, $C_1$-$C_8$ alkyl, hydroxy-($C_1$-$C_8$ alkyl), aryl-($C_1$-$C_8$ alkyl), ($C_1$-$C_8$ alkyl)-aryl, alkylthio, α1,2Man, α1,6GalNAc, β1,3Galβ1,4Glc, α1,2Man-$R^8$, α1,6GalNAc-$R^8$, and β1,3Gal-$R^8$. $R^8$ may be H, $C_1$-$C_8$ alkyl, $C_1$-$C_8$ alkoxy, hydroxy-($C_1$-$C_8$ alkyl), aryl-($C_1$-$C_8$ alkyl), ($C_1$-$C_8$ alkyl)-aryl, or alkylthio. In the formula, m and n are integers and may be either 3 or 4; p may be zero or 1.

The substituted groups mentioned above may be substituted by hydroxy, hydroxy($C_1$-$C_4$ alkyl), polyhydroxy($C_1$-$C_4$ alkyl), alkanoamido, or hydroxyalknoamido substituents. Preferred substituents include hydroxy, polyhydroxy($C_3$ alkyl), acetamido and hydroxyacetamido. A substituted radical may have more than one substitution, which may be the same or different.

For embodiments in which $R^1$ is an oligosaccharide, the oligosaccharide is preferably a trisaccharide. Preferred trisaccharides include NeuAcα2,3Galβ1,4GlcNAcβ1,3 or NeuGcα2,3Galβ1,4GlcNAcβ1,3.

For embodiments in which $R^1$ is the group having the formula

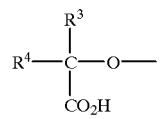

$R^3$ and $R^4$ preferably form a single radical having the formula

—$R^5$—or —($R^6$)$_q$—O—($R^7$)$_r$— in which $R^5$ is $C_3$-$C_7$ divalent alkyl, substituted or unsubstituted, $R^6$ and $R^7$ are the same or different and are $C_1$-$C_6$ divalent alkyl, substituted or unsubstituted. In the formula, q and r are integers which may be the same or different and are either zero or 1. The sum of q and r is always at least 1.

A more preferred structure for a single radical formed by $R^3$ and $R^4$ is one having the formula

—($R^6$)—O— in which $R^6$ is $C_3$-$C_4$ divalent alkyl, substituted or unsubstituted. For instance, $R^6$ may have the formula —$CH_2$—

$CH_2$—$CH_2$—$CH_2$—, preferably substituted. The radical can be substituted with hydroxy, polyhydroxy($C_3$ alkyl), and substituted or unsubstituted alkanoamido groups, such as acetamido or hydroxyacetamido. The substituted structure will typically form a monosaccharide, preferably a sialic acid such as NeuAc or NeuGc linked α2,3 to the Gal residue.

In the general formula, above, both m and n are integers and can be either 3 or 4. Thus, in one set of structures Gal is linked β1,4 and Fuc is linked α1,3 to GlcNAc. This formula includes the $SLe^x$ tetrasaccharide. $SLe^x$ has the formula NeuAcα2,3Galβ1,4(Fucα1,3)GlcNAcβ1—. This structure is selectively recognized by LECCAM-bearing cells. $SLe^x$ compounds that can be purified using the methods of the invention include NeuAcα2,3Galβ1,4(Fucα1,3)GlcNAcβ1-Gal-OEt, NeuAcα1,3Galβ1,4(Fucα1,3)GlcNAcβ1,4Galβ1-OEt, and others that are described in international application WO 91/19502. Other compounds that one can purify using the methods include those described in U.S. Pat. No. 5,604,207 having the formula

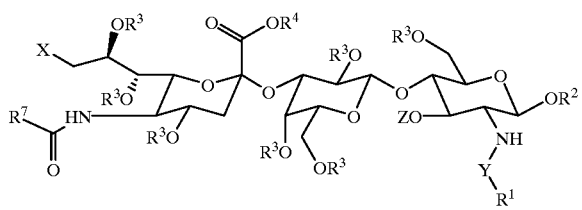

wherein Z is hydrogen, $C_1$-$C_6$ acyl or

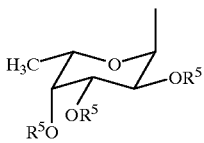

Y is selected from the group consisting of C(O), $SO_2$, HNC(O), OC(O) and SC(O);

$R^1$ is selected from the group consisting of an aryl, a substituted aryl and a phenyl $C_1$-$C_3$ alkylene group, wherein said aryl substituent is selected from the group consisting of a halo, trifluoromethyl, nitro, $C_1$-$C_{18}$ alkyl, $C_1$-$C_{18}$ alkoxy, amino, mono-$C_1$-$C_{18}$ alkylamino, di-$C_1$-$C_{18}$ alkylamino, benzylamino, $C_1$-$C_{18}$ alkylbenzylamino, $C_1$-$C_{18}$ thioaklyl and $C_1$-$C_{18}$ alkyl carboxamido groups, or $R^1$Y is allyloxycarbonyl or chloroacetyl;

$R^2$ is selected from the group consisting of monosaccharide (including β1,3Gal-OR, where R=H, alkyl, aryl or acyl), disaccharide, hydrogen, $C_1$-$C_{18}$ straight chain, branched chain or cyclic hydrocarbyl, $C_1$-$C_6$ alkyl, 3-(3,4,5-trimethoxyphenyl)propyl, $C_1$-$C_5$ alkylene ω-carboxylate, ω-trisubstituted silyl $C_2$-$C_4$ alkylene wherein said ω-trisubstituted silyl is a silyl group having three substituents independently selected from the group consisting of $C_1$-$C_4$ alkyl, phenyl, or $OR^2$ together form a $C_1$-$C_{18}$ straight chain, branched chain or cyclic hydrocarbyl carbamate;

$R^3$ is hydrogen or $C_1$-$C_6$ acyl;

$R^4$ is hydrogen, $C_1$-$C_6$ alkyl or benzyl;

$R^5$ is selected from the group consisting of hydrogen, benzyl, methoxybenzyl, dimethoxybenzyl and $C_1$-$C_6$ acyl;

$R^7$ is methyl or hydroxymethyl; and

X is selected from the group consisting of $C_1$-$C_6$ acyloxy, $C_2$-$C_6$ hydroxylacyloxy, hydroxy, halo and azido.

A related set of structures included in the general formula are those in which Gal is linked β1,3 and Fuc is linked α1,4. For instance, the tetrasaccharide, NeuAcα2,3Galβ1,3(Fucα1,4)GlcNAcβ1—, termed here $SLe^a$, is recognized by selectin receptors. See, Berg et al., *J. Biol. Chem.*, 266:14869–14872 (1991). In particular, Berg et al. showed that cells transformed with E-selectin cDNA selectively bound neoglycoproteins comprising $SLe^a$.

The methods of the invention are also useful for purifying oligosaccharide compounds having the general formula Galα1,3Gal—, including Galα1,3Galβ1,4Glc(R)β—O—$R^1$, wherein $R^1$ is —$(CH_2)_n$—COX, with X=OH, $OR^2$, —$NHNH_2$, R=OH or NAc, and $R^2$ is a hydrogen, a saccharide, an oligosaccharide or an aglycon group having at least one carbon atom, and n=an integer from 2 to 18, more preferably from 2 to 10. For example, one can purify a compound having the formula Galα1,3Galβ1,4GlcNAcβ—O—$(CH_2)_5$—COOH using procedures such as those described in Examples 7–8. Also among the compounds that can be purified according to the invention are lacto-N-neotetraose (LNnT), GlcNAcβ1,3Galβ1,4Glc (LNT-2), sialyl(α2,3)-lactose, and sialyl(α2,6)-lactose.

In the above descriptions, the terms are generally used according to their standard meanings. The term "alkyl" as used herein means a branched or unbranched, saturated or unsaturated, monovalent or divalent, hydrocarbon radical having from 1 to 20 carbons, including lower alkyls of 1–8 carbons such as methyl, ethyl, n-propyl, butyl, n-hexyl, and the like, cycloalkyls (3–7 carbons), cycloalkylmethyls (4–8 carbons), and arylalkyls. The term "alkoxy" refers to alkyl radicals attached to the remainder of the molecule by an oxygen, e.g., ethoxy, methoxy, or n-propoxy. The term "alkylthio" refers to alkyl radicals attached to the remainder of the molecule by a sulfur. The term of "acyl" refers to a radical derived from an organic acid by the removal of the hydroxyl group. Examples include acetyl, propionyl, oleoyl, myristoyl.

The term "aryl" refers to a radical derived from an aromatic hydrocarbon by the removal of one atom, e.g., phenyl from benzene. The aromatic hydrocarbon may have more than one unsaturated carbon ring, e.g., naphthyl.

The term "alkoxy" refers to alkyl radicals attached to the remainder of the molecule by an oxygen, e.g. ethoxy, methoxy, or n-propoxy.

The term "alkylthio" refers to alkyl radicals attached to the remainder of the molecule by a sulfur.

An "alkanoamido" radical has the general formula —NH—CO—($C_1$-$C_6$ alkyl) and may or may not be substituted. If substituted, the substituent is typically hydroxyl. The term specifically includes two preferred structures, acetamido, —NH—CO—$CH_3$, and hydroxyacetamido, —NH—CO—$CH_2$—OH.

The term "heterocyclic compounds" refers to ring compounds having three or more atoms in which at least one of the atoms is other than carbon (e.g., N, O, S, Se, P, or As). Examples of such compounds include furans (including the furanose form of pentoses, such as fucose), pyrans (including the pyranose form of hexoses, such as glucose and galactose) pyrimidines, purines, pyrazines and the like.

The methods of the invention are useful not only for purifying carbohydrates that that are newly synthesized, but also those that are the products of degradation, e.g., enzymatic degradation. See, e.g., Sinnott, M. L., *Chem. Rev.* 90: 1171–1202 (1990) for examples of enzymes that catalyze degradation of oligosaccharides.

The invention also provides methods for purifying nucleotides, nucleotide sugars, and related compounds. For example, a nucleotide sugar such as GDP-fucose, GDP-mannose, CMP-NeuAc, UDP-glucose, UDP-galactose, UDP-N-acetylgalactosamine, and the like, can be purified by the methods described herein. The methods are also useful for purifying nucleotides and nucleotides in various states of phosphorylation (e.g., CMP, CDP, CTP, GMP, GDP, GTP, TMP, TDP, TTP, AMP, ADP, ATP, UMP, UDP, UTP), as well as the deoxy forms of these and other nucleotides.

The following examples are offered solely for the purposes of illustration, and are intended neither to limit nor to define the invention.

EXAMPLES

Examples 1–5 demonstrate the synthesis of sialyl lactose and its purification using nanofiltration and ion exchange. In summary, N-acetyl-D-mannosamine (ManNAc) was generated from N-acetyl-D-glucosamine (GluNAc) under basic conditions. The ManNAc was condensed with sodium pyruvate to produce sialic acid enzymatically. The sialyltransferase cycle was used to convert the sialic acid into sialyl lactose, which was then purified by nanofiltration and ionic exchange. Example 6 demonstrates the separation of organics and inorganic salts by nanofiltration. Example 7 demonstrates the separation characteristics of polybenzamide nanofiltration membranes. Example 8 demonstrates the separation characteristics of polyamide nanofiltration membranes.

Example 1

Synthesis and Purification of Sialic Acid

This example demonstrates a method for synthesizing sialic acid using a relatively inexpensive substrate, GlcNAc, rather than the more expensive ManNAc or sialic acid. A procedure similar to that described in Simon et al., *J. Am. Chem. Soc.* 110:7159 (1988), was used to convert GlcNAc to ManNAc. Briefly, GlcNAc (1000 g, 4.52 mole) was dissolved in water (500 ml). The pH was adjusted to 12.0 with 50% NaOH (~115 ml). The solution was stirred under argon for 7.5 hours, then cooled in an ice bath and the pH was adjusted to 7.7 with concentrated HCl (~200 ml). Sialic acid was then produced by aldol condensation of ManNAc.

To obtain sialic acid, the ManNAc produced in the previous step was subjected to aldol condensation mediated by N-acetylneuraminic acid (NeuAc) aldolase and pyruvic acid. To a 1.5 L aqueous solution containing approximately 57 g (0.258 mol) ManNAc and 193 g GlcNAc from base-catalyzed epimerization was added 123.8 g sodium pyruvate (1.125 mole), 1.5 g bovine serum albumin, and 0.75 g sodium azide. The pH was adjusted to 7.5 and 11,930 U of sialic acid aldolase was added. The solution was incubated at 37° C. for 7 days. HPLC analysis on an Aminex HPX87H (BioRad) column (0.004 M $H_2SO_4$, 0.8 ml/min, monitor $A_{220}$) revealed that the solution contained 0.157 M sialic acid (91% conversion of ManNAc, 0.235 mol).

Example 2

Synthesis of Sialyl Lactose using Sialyltransferase Cycle

To the sialic acid produced in Example 1 was added lactose monohydrate (79.2 g, 0.22 mol), 0.7 g bovine serum albumin, phosphoenolpyruvate monopotassium salt (37 g, 0.22 mol), and the pH was adjusted to 7.5. CMP (2.84 g, 0,0088 mol), ATP (0.54 g, 0.0009 mol) were added, and the pH readjusted to 7.5. Sodium azide (0.35 g) was added, as were the following enzymes: pyruvate kinase (19,800 U), myokinase (13,200 U), CMP sialic acid synthetase (440U, and sialyltransferase (165U). 66 ml of 1M $MnCl_2$ was added and the final volume adjusted to 2.2 L with water. The reaction was carried out at room temperature.

The reaction was monitored daily by thin layer chromatography (TLC) and [$Mn^{2+}$] was determined by ion chromatography. Additions/adjustments were made as shown in Table 1:

TABLE 1

| Day 2 | 44 ml 1M $MnCl_2$ added |
|---|---|
| Day 4 | 43 ml 1M $MnCl_2$ added |
| Day 6 | added 34.3 ml 1M $MnCl_2$, 37 g PEP; pH readjusted to 7.5; pyruvate kinase (19,800 U), myokinase (13,200 U), CMP sialic acid synthetase (440 U), and sialyltransferase (165 U) |
| Day 7 | 31.7 ml 1M $MnCl_2$ |
| Day 8 | 24.6 ml 1M $MnCl_2$ |
| Day 9 | 44 ml 1M $MnCl_2$ |
| Day 10 | 30.8 ml 1M $MnCl_2$ |
| Day 11 | 31.7 ml 1M $MnCl_2$ |
| Day 12 | 24.6 ml 1M $MnCl_2$, pH readjusted to 7.5 |
| Day 13 | 440 U CMP sialic acid synthetase, 82.5 U sialyltransferase |
| Day 14 | pH readjusted to 7.5 |
| Day 16 | 37.7 ml 1M $MnCl_2$, 19,800 U pyruvate kinase, 13,200 U myokinase |
| Day 17 | 26 g phosphenolpyruvate, trisodium salt |

The sialyl lactose yield was approximately 70–80% as determined by TLC.

Example 3

Synthesis of Sialyl Lactose using Sialyltransferase Cycle

This example illustrates the production of a-N-acetylneuraminic acid(2,3)β-galactosyl(1,4)glucose using the sialyl transferase cycle with control of the manganese ion concentration.

In a polypropylene vessel, phosphoenolpyruvate trisodium salt (285.4 g, 1.22 mol) and sialic acid (197 g, 0.637 mol) were dissolved in 5 L of water and the pH was adjusted to 7.1 with 6 M NaOH, Cytidine-5'-monophosphate (5.14 g, 15.9 mmol) and potassium chloride (7.9 g, 0.106 mol) were added and the pH was re-adjusted to 7.45 with 6 M NaOH. Pyruvate kinase (28,000 units), myokinase (17,000 units), adenosine triphosphate (0.98 g, 1.6 mmol), CMP NeuAc synthetase (1325 units), α2,3 sialyltransferase (663 units) and $MnCl_2.4H_2O$ (52.4 g, 0.265 mol) were added and mixed. To a 3.7 L portion of the resulting mixture was added lactose (119g, 0.348 mol) and sodium azide (1.75 g). The reaction mixture was kept at room temperature and monitored daily by thin layer chromatography (tlc) and ion chromatography. After two days, additional enzymes were added as follows: pyruvate kinase (38,100 units), myokinase (23,700 units), CMP NeuAc synthetase (935 units), and α2,3 sialyltransferase (463 units). The pH was periodically adjusted to 7.5 with 6 M NaOH. Additionally, the manganese ion concentration was measured and supplemented as shown in Table 2 below.

TABLE 2

| Day | $[Mn^{++}]$ (measured, mM) | Loss of $Mn^{++}$ (from previous day) | Amount Supplemented (mL of 1M, final added conc) |
|---|---|---|---|
| 1 | 28 | 22.0 | none |
| 2 | 23.9 | 4.1 | none |
| 3 | 10.7 | 13.2 | 111 mL, + 30 mM |
| 4 | 1.4 | 39.3 | 111 mL, + 30 mM |
| 5 | 3.0 | 28.4 | 148 mL, + 40 mM |
| 6 | 12.9 | 30.1 | 74 mL, + 20 mM |
| 7 | 10.0 | 22.9 | 80 mL, + 20 mM |
| 8 | 12.0 | 18.0 | 80 mL, + 20 mM |
| 9 | 24.3 | 7.7 | none |

On day 9, the reaction was essentially complete by tlc. As the results in the table indicate, the depletion of $Mn^{++}$ resulted in additional amounts of $MnCl_2.4H_2O$ being added almost daily to maintain the metal ion concentration. Manganese ion is a required cofactor for at least one enzyme in the sialyl transferase cycle. However, the manganese ion and the inorganic phosphate produced form a complex of very low solubility. Because of this limited solubility, the transferase cycle can continue to proceed, but at reduced reaction rates. By supplementing the manganese ions which are lost by precipitation with pyrophosphate, the rate of reaction can be maintained. Thus, when manganese ion concentration is maintained in an optimal range, the sialyl transferase reaction cycle can be driven to completion.

Example 4

Purification of Sialyllactose using Ion Exchange and Reverse Osmosis

This example illustrates the workup and purification of the trisaccharide produced in Example 2 followed by per-acetylation and esterification. A solution (2L) of sodium 5-acetamido-3,5-dideoxy-α-D-glycero-D-galacto-nonulopyranosylonate-(2-3)-O-β-D-galactopyranosyl-(1-4)-O-β-D-glucopyranose produced from the action of a sialyl transferase in the presence of the appropriate cofactors on lactose (55 g) was filtered through paper. The filtrate was run through a membrane with a 3000 or 10,000 molecular weight cut off to remove protein from the desired product. The eluate was concentrated and desalted by running it against a polyamide reverse osmosis membrane in a suitable apparatus (Cat. No. CDRN500 60, Millipore, Bedford, Mass.). The retentate containing the product was evaporated to a thick syrup. Optionally the retentate can be treated with a chelating resin to remove divalent cations. After filtration the filtrate contained the desired product substantially free of salts and in a high state of purity as shown by $^1$Hmr spectroscopy. Otherwise the syrup was so evaporated twice with pyridine (2×200 mL). The evaporation flask was charged with a solution of N,N-dimethylaminopyridine (2.2 g) in pyridine (1.2 L). Acetic anhydride (0.83 L) was added during a period of 1 hour. The resulting mixture was left for 24–48 hours rotating slowly at room temperature. The reaction is checked by TLC (methanol:dichloromethane 1:9). Upon complete reaction vacuum is applied and the solution is evaporated to give a residue.

The residue was dissolved in ethyl acetate (1.5 L). This solution was washed with 5% aqueous hydrochloric acid (1.5 L) followed by saturated aqueous sodium bicarbonate (1.5 L) and finally water (1.5 L). The organic layer was dried over anhydrous sodium sulfate and filtered. The filtrate was concentrated to a semi-solid residue. The per-O-acetylated lactone trisaccharide (69 g) was dissolved in methanol (350 mL) and a sodium methoxide solution (17.5 mL, 25% solution in methanol) was added followed by water (3.5 mL). When TLC developed with isopropanol:ammonium hydroxide:water 7:1:2 showed the reaction to be complete acetic acid (2 mL) was added to the solution. Ethyl ether (180 mL) was added to the solution to precipitate the product. This solid was filtered and dissolved in water (350 mL). Charcoal (24 g) was added to this solution and heated to 60° C. for one hour. This solution was allowed to cool to ambient temperature and filtered. Evaporation of the filtrate gave the solid product (34 g). $^1$H-NMR spectroscopy showed this solid to be pure sialyl lactose containing 11% sodium acetate weight by weight.

Example 5

Purification of Sialyl Lactose using Nanofiltration

A reaction mixture similar to that described in Example 2 was subjected to filtration using an ultrafiltration membrane having a MWCO of 10 kDa to remove the proteins. The phosphate concentration $[PO_4^{3-}]$, as determined by a standard phosphorus assay procedure described below, was greater than 2.8 mM.

The solution was adjusted with concentrated HCl (~500 ml) to pH=3.0. It was then purified on the Osmonics 213T membrane purification machine (membrane type MX07) at pH=3 for 5 hours until the conductivity of the permeate solution remained unchanged. The solution was then rinsed from the machine and the combined rinse and feed solution treated with NaOH until pH 7.4. The $Mn^{2+}$ concentration was measured by HPLC, as described below. The nanofiltration parameters were as follows:

Operation pressure: $P_f$=100 psi
Concentrate Flow Rate: $Q_c$=5 GPM
Permeate Flow Rate: $Q_f$=7 GPH
Temperature range: 20–40° C.
Volume: 5 Gallons The conductivity of the initial permeate was 28.1 mS; after 5 hours of recirculation, the conductivity had dropped to 115 $\mu$S, the phosphate concentration $[PO_4^{3-}]$ had decreased to 770 $\mu$M, and the manganese concentration $[Mn^{2+}]$ was 3.4 mM.

The solution was then adjusted to pH 7,4 and further purified on the membrane purification machine (Osmonics, membrane type MX07) for about 1 hour until the conductivity of the permeate solution remained unchanged. The solution was then rinsed out from the membrane machine, The nanofiltration parameters were:

Operation Pressure: $P_f$=100 psi

Concentrate Flow Rate: $Q_c$=5 GPM

Permeate Flow Rate: $Q_f$=0.3 GPM

Temperature Range: 20–40° C.

Volume: 5 Gallon

The results of the filtration were as follows:

Conductivity: initial permeate conductivity: 2.01 mS
after 5 hours recirculation: 93.7 $\mu$S Phosphate Concentration: $[PO_4^{3-}]$=410 $\mu$M Manganese Concentration: $[Mn^{2+}]$=3.0 mM The above solution (6 Gal) was then treated with AG50WX8 ($H^+$) resin (BioRad, 1.18 Kg) and stirred for 2 hours until pH=2.0. The resin was then filtered to provide a very light yellow solution. Only minimal amount of $[Mn^{2+}]$ was detected by HPLC. The solution was then neutralized with NaOH (50% w/w) to a pH of 7.4.

Before resin treatment: $[Mn^{2+}]$=3 mM; $[PO_4^{3-}]$=410 $\mu$M

After resin treatment: pH=3, $[Mn^{2+}]$=1.23 mM;
pH=2, $[Mn^{2+}]$=6.8 $\mu$M; $[PO_4^{3-}]$=190 $\mu$M Some small portions of the above solution were treated with AG1X8 (acetate form) resin to further remove the phosphate. The results are shown in Table 3 below:

TABLE 3

| Sample Volume (ml) | Weight of resin (g) | Stirring Time (hour) | $[PO_4^{3-}]$ $\mu$M |
|---|---|---|---|
| 50 ml | 0.25 g | 1 | 86 |
| 50 ml | 0.5 g | 1 | 41 |
| 50 ml | 1.0 g | 1 | 30 |
| 50 ml | 2.0 g | 1 | 8 |

The solution was further purified by recirculation of the solution using an Osmonic membrane purification machine (Osmonic MX07) for 5 hours under the following conditions:

Operation pressure: $P_f$=100 psi

Concentrate Flow Rate: $Q_c$=5 GPM

Permeate Flow Rate: $Q_f$=0.2 GPM

Temperature range: 20–40° C.

Volume: 5 Gallon

Results were as follows:

Permeate Conductivity: initial permeate conductivity: 0.136 mS
after 5 hours' separation: 45 $\mu$S The solution was then concentrated to 3–4 L, after which activated charcoal (J. T. Baker, 180 g) was added. The suspension was heated at 55° C. for 2 hours. Charcoal was then removed by filtration to yield a very light yellow solution, which was lyophilized to a white solid.

Analysis data for the sialyl lactose solution purified as described above are shown in Table 4.

TABLE 4

| Assay | Result | Method |
|---|---|---|
| $PO_4^{3-}$ content | 330 ppm (by weight) | Phosphate assay[1] |
| Nucleotide/nucleoside content | a) Not detected ($ABS_{280}$ = 0.0) b) Not detected | UV (0.1 mM, sialylactose) $^1$H-NMR |
| $Mn^{2+}$ content | 80 ppm (by weight) | Determined by HPLC[2] |
| Sialyl lactose content | 71% | $^1$H-NMR (1,2-isopropylidene D-glucose furanose was used as a standard |
| Sialic acid content | ~2% | $^1$H-NMR |
| Lactose content | Not detectable | $^1$H-NMR |
| Acetate content | Not detectable | $^1$H-NMR |
| N-acetyl glucosamine content | Not detectable | $^1$H-NMR |
| Pyruvate content | Not detectable | $^1$H-NMR |

[1]Phosphate Assay Method

The unknown sample (100 $\mu$l) was diluted with D.I. water (775 $\mu$l). The solution was then treated with 100 $\mu$l of acid molybdate (prepared by dissolving 1.25 g of ammonium molybdate in 100 $\mu$l of 2.5N $H_2SO_4$), 25 $\mu$l of Fiska Subha Row Solution (purchased from Sigma as a powder, and prepared according to manufacturer's directions). The mixture was heated at 100° C. for 7 min, the absorption at 810 nm was then recorded. The concentration was determined by comparing the absorption with a phosphate standard curve.

[2]HPLC Assay for the determination of $Mn^{2+}$ concentration:

Column: Alltech Universal Cation column, 0.46×10 cm

Detector Alltech model 320 conductivity detector

Mobile phase: 3mM phthalic acid, 0.5 mM dipicolinic acid

Flow rate: 1.5 ml/min

Column oven temperature: 35° C.

Example 6

Separation of Organics and Inorganic Salts by Nanofiltration

Various nanofiltration membranes were tested for ability to separate various organic compounds and inorganic salts from an aqueous solution. The membranes were tested at two different pHs to demonstrate that by adjusting the ionic charge of certain compounds, the separation profile can be modulated. Results are shown in Table 5.

The nanofiltration membranes tested were the MX07, SX12, and B006 produced by Osmonics, Inc. (Minnetonka Minn.) and the DL2540 produced by Osmonics, DeSalination Systems. The MX07 membrane was used as described in Example 5 above. Parameters for the remaining membranes were as shown in Table 6.

TABLE 5

Percentage of Compound Passing Through Membrane in 30 Minutes

| Membrane | MX07[a] | | SX12[a] | | B006[a] | | DL2540[a] | |
|---|---|---|---|---|---|---|---|---|
| | pH 7.5 | pH 3.0 | pH 7.5 | pH 3.0 | pH 7.5 | pH 3.0 | pH 7.5 | pH 3.0 |
| Compound | | | | | | | | |
| Sodium Phosphate | 10 | 46 | 20 | 39 | 15 | 64 | 1.8[b] | |
| Manganese | 86 | | 40 | 40 | 92 | 92 | | |
| Sodium Pyruvate | 35 | 59 | 45 | 65 | 34 | 65 | | |
| GlcNAc | 70 | 28 | | | 84 | | 12 | |
| Lactose | 36 | <5 | | | pass | | | |
| Raffinose | 0 | 0 | 8 | | 52 | | | |
| Sialic Acid | 12 | 5 | | | | | <1 | 1 |
| Sodium | 56 | | | | | | | |
| CMP | <1 | <1 | | | | | | |
| PEP | <1 | 8 | | | | | | |

Notes:
[a]Pass % based upon separation time 30 mins.
[b]Temp. tested at 20° C. and 40° C.
GluNAc: N-Acetyl-D-Glucosamine
PEP: 2-Phosphoenolpyruvate Trisodium Salt
CMP: Cytidine 5'-monophosphate
Membranes MX07, SX12, B006 from Osmonics, Inc., DL2540 from Osmonics, Desalination Systems (Escondido, CA).

TABLE 6

| | SX12 | B006 | DL2540 |
|---|---|---|---|
| Pressure ($P_f$) (PSI) | 200 | 100 | 200 |
| Concentrate Flow Rate ($Q_c$) (GPM) | 4.5 | 4 | 4 |
| Permeate Flow Rate ($Q_f$) (GPM) | 0.2 | 0.5 | 0.6 |
| Temperature Range (° C.) | 20–40 | 20–40 | 20–40 |
| Volume (Gal) | 5 | 5 | 5 |

Example 7

Separation Characteristics of Polybenzamide Nanofiltration Membranes

This Example describes experiments which demonstrate that a polybenzamide membrane (YK, Osmonics) is effective for the purification of sugars, in both flat-sheet and spiral-wound forms. The membrane was tested at varying pH levels for the passage or retention of sugars and salts.

MATERIALS AND METHODS

A. Flat Sheet and Spiral Wound Machine Operations and Membrane Preparation

A Desal membrane machine (Osmonics, Desalination Systems, Escondido, Calif.) with membrane YK was washed thoroughly by first rinsing the machine 4 to 5 times, each with approximately 1L of distilled water. The water was poured into the feed tank, circulated for about a minute (~100 psi), and emptied using the drain valve, twisting it counterclockwise to an open position. The valve was closed after emptying, and the process was repeated 4 to 5 times. After rinsing, approximately 1 more L of water was added. The system was recirculated at a pressure of 150 psi for 30 min and then was emptied. The system including the membrane was then used in the following experiments.

After the completion of each experiment, the machine was washed with water 3 to 4 times as described above. Then, about 1L of water was recirculated for about 15–20 minutes at 100–150 psi and emptied from the machine. Occasionally this was followed by an extra brief washing, if some of the test compound was suspected to still remain in the apparatus. The conductivity was always checked to make sure that all the sample was removed. If the conductivity remained high, the machine was washed until the contaminants were virtually undetectable. Most of the ionic compounds were removed easily, with the exception of $MnCl_2$, which only required 1 or 2 extra short washings.

B. Testing of Salts

To determine the retention characteristics of various salts, 10 mM solutions of the following salts were tested with the flat sheet membranes: $MnCl_2$, $NaH_2PO_4$, $NaC_3H_3O_3$, NaOAc, $Na_4P_2O_7$, sodium benzoate, $MgSO_4$, $NaN_3$, and NaCl. A 1L solution of one of the salts was poured into the feed tank and recirculated at 100 psi for about 15 min. At this point, samples of both the permeate and the concentrate were collected and measured using a conductivity meter. The samples were collected every five minutes thereafter, with a total of at least three collections for each sample run. The percentage of salt passing through the membrane (the "percentage pass") was calculated by dividing the conductivity of the permeate by the conductivity of the concentrate.

After the first run was completed, the pH of the solution was then lowered to pH 3.0, when possible, using a conjugate acid of the salt being tested. The solution was recirculated while adjusting the pH to assure that the solution inside the machine was mixed as well. The testing process was repeated, with conductivity of both the permeate and the concentrate being determined. The solution was then brought to a pH of about 7.0 with a conjugate base, and once again the run was repeated at the new pH. Again, conductivity of both the permeate and concentrate was determined.

C. Testing of Sugars

Sugars that were tested included sialyl lactose, lactose, N-acetyl glucosamine, NeuAcα2,3Galβ1,4(Fucα1,3)

GlcNAcβ1,4Galβ1-OEt (Compound I), Galα1,3Galβ1, 4GlcNAcβ—O—(CH$_2$)$_5$—COOH (Compound II), LNT-2, LNnT, CMP, cytidine, and sialic acid. A sugar solution (1L) was poured into the feed container and recirculated at 100 psi for at least 10 minutes. Samples of the permeate and concentrate were taken at 10 min, and another sample of the permeate was taken at 15 min. The samples were compared visually by TLC. Any pH adjustments that were made were by using HCl and/or NaOH.

RESULTS

A. Flat Sheet Membrane

The retention characteristics for various salts and sugars of a flat sheet polybenzamide nanofiltration membrane (YK002 on YV+ paper backing (Osmonics) are shown in Table 7. The experiments were conducted at a temperature of 25–35° C. and a permeate flow rate of 2–8 mL/min.

TABLE 7

| Material | Concentration | Pressure (psi) | % Pass* pH 3.0 | % Pass* pH 5** | % Pass* pH 7 |
|---|---|---|---|---|---|
| MnCl$_2$ | 10 mM | 100 | 66 | 12 | 9.8 |
| NaH$_2$PO$_4$ | 10 mM | 100 | 82 | 15 | 4.6 |
| NaPyruvate | 10 mM | 100 | 80 | 36 | 9.8 |
| NaCl | 10 mM | 100 | — | — | 18 |
| Sialyl lactose*** | 10 g/L | 100 | 0 | — | 0 |
| Compound I*** | 10 g/L | 100 | 0 | — | 0 |
| Compound II*** | 2 g/L | 100 | 0 | — | 0 |
| LNT-2*** | .4 g/L | 100 | 0 | — | 0 |
| LNnT*** | .35 g/L | 100 | 0 | — | 0 |
| Lactose | 10 g/L | 100 | 0.0 | 0.3 | — |
| GlcNAc | 10 g/L | 100 | 5.9 | — | 3.7 |
| Na$_4$P$_2$O$_7$ | 10 mM | 100 | 19 | 2.0 | 1.4 |
| Sialic Acid*** | 10 mM | 100 | 0 | — | — |
| Cytidine*** | 1 g/L | 100 | 0 | — | trace |
| CMP*** | 1 g/L | 100 | 0 | — | 0 |
| Benzyl Alcohol*** | 1.5 % vol | 100 | — | — | 100 |
| NaN$_3$ | 10 mM | 100 | 81 | — | 67 |
| MgSO$_4$ | 10 mM | 100 | 38 | — | 2.9 |
| Benzoic acid | ~0.5 g/L | 100 | 99 | — | — |
| Na Benzoate | 2.5 % | 100 | — | — | 42 |

*% Pass is the percent ratio of the amount of material in the permeate to the amount of material in the concentrate.
**"pH 5" ranges from 4.8 to 5.6  "pH 7" ranges from 6.1 to 7.4
***Determined visually from TLC B. Spiral Wound Membrane The retention characteristics for various salts and sugars of a spiral wound polybenzamide nanofiltration membrane (YK1812CZA; Osmonics) are shown in Table 8. The experiments were conducted at a temperature of 25–35° C. and a permeate flow rate of 3 mL/sec.

TABLE 8

| Material | Concentration | Pressure (psi) | % Pass* pH 3** | % Pass* pH 5** | % Pass* pH 7 |
|---|---|---|---|---|---|
| MnCl$_2$ | 10 mM | 100 | 50 | — | 40 (pH 6.2) |
| NaH$_2$PO$_4$ | 10 mM | 100 | 67 | 49 | 19 |
| NaOAc | 10 mM | 100 | — | 81 | 65 |
| NaPyruvate | 10 mM | 100 | 81 | — | 26 |
| NaCl | 10 mM | 100 | 79 | 78 | — |
| Sialyl lactose*** | 10 g/L | 100 | 0 | — | 0 |

TABLE 8-continued

| Material | Concentration | Pressure (psi) | % Pass* pH 3** | % Pass* pH 5** | % Pass* pH 7 |
|---|---|---|---|---|---|
| Compound I*** | 10 g/L | 100 | 0 | — | 0 |
| Compound II*** | 2 g/L | 100 | 0 | — | 0 |
| LNT-2*** | 0.4 g/L | 100 | 0 | — | 0 |
| Lactose | 10 g/L | 100 | 0.59 | — | 2.3 |
| GlcNAc | 10 g/L | 100 | 13 | 7.1 | 19 |
| Na$_4$P$_2$O$_7$ | 10 mM | 100 | 65 | — | 5.2 |
| Sialic Acid*** | 10 mM | 100 | 0 | — | 0 |
| Cytidine*** | 1 g/L | 100 | ~10 | — | ~5–10 |
| CMP*** | 1 g/L | 100 | trace | — | trace |
| Sodium Benzoate | ~0.5 g/L | 100 | 93 | — | 97 |

*% Pass is the percent ratio of the amount of material in the permeate to the amount of material in the concentrate.
**"pH 5" ranged from 4.5 to 5.2  "pH 7" ranged from 6.6 to 7.0  "pH 3" ranged from 2.8 to 3.4
***Determined visually from TLC
"trace is defined as barely detectable by TLC as seen by eye.

These results indicate that the YK002 flat sheet membrane and the YK1812CZA spiral wound membrane retained sialyl lactose as well as Compounds I and II, LNT-2, and LNnT, while allowing ionic compounds to pass, making this membrane type a good choice for purification of such saccharides.

Example 8

Separation Characteristics of Polyamide Nanofiltration Membranes

This Example describes the evaluation of several polyamide membranes for use in the purification of sugars, in both flat-sheet and spiral-wound forms. The membranes were tested at varying pH levels for the passage or retention of sugars and salts.

MATERIALS AND METHODS

A. Flat Sheet and Spiral Wound Machine Operations and Membrane Preparation

A Desal membrane machine (Osmonics, Desalination Systems) with a polyamide membrane G-5 (GE; Osmonics) was washed thoroughly by first rinsing the machine 4 to 5 times, each with approximately 1L of distilled water. The water was poured into the feed tank, circulated for about a minute (~100 psi), and emptied using the drain valve. The valve was closed after emptying, and the process was repeated 4 to 5 times. After rinsing, approximately one more L of water was added. The system was recirculated at a pressure of 150 psi for 30 min and then was emptied. The system including the membrane was then ready for application testing.

After each experiment, the machine was washed with water 3 to 4 times as described above. Then, about 1L of water was recirculated for about 15–20 minutes at 100–150 psi and the machine was emptied. Occasionally this was followed by an extra brief washing, if some of the compound was suspected to still remain in the apparatus. The conductivity was always checked to make sure that all the sample was removed. If the conductivity remained high, the machine was washed until the contaminants were virtually undetectable. Most of the ionic compounds were removed easily, with the exception of $MnCl_2$, which only required 1 or 2 extra short washings.

B. Testing of Salts

A 10 mM solution of the following salts were tested with the flat sheet membranes: $MnCl_2$, $NaH_2PO_4$, $NaC_3H_3O_3$, and NaCl. A 1L solution of one of the salts was poured into the feed tank and recirculated at 100 psi for about 15 min. At this point, samples of both the permeate and the concentrate were collected and measured using a conductivity meter. The samples were collected every five minutes thereafter, with a total of at least three collections for each sample run. The percentage pass was calculated by dividing the conductivity of the permeate by the conductivity of the concentrate. After the run was completed, the pH of the solution was lowered to pH 3.0, when possible, using a conjugate acid of the salt being tested. The solution was recirculated while adjusting the pH to assure that the solution inside the machine was mixed as well. The testing process was repeated, collecting data as before. Then the solution was brought to a pH of about 7.0 with a conjugate base, and once again the run was repeated at the new pH. The machine was then emptied and rinsed as described above.

C. Testing of Sugars

The sugars that were tested included sialyl lactose, lactose, NeuAcα2,3Galβ1,4(Fucα1,3)GlcNAcβ1,4Galβ1-OEt (Compound I), Galα1,3Galβ1,4GlcNAcβ—O—$(CH_2)_5$—COOH (Compound II), LNT-2, and LNnT. A sugar solution (1L) was poured into the feed container and recirculated at 100 psi for at least 10 minutes. Samples of the permeate and concentrate were taken at 10 min, and another sample of the permeate was taken at 15 min. The samples were compared visually by TLC. Any pH adjustments that were made were by using HCl and/or NaOH. After the sugar had been tested, it was transferred into a Pyrex flask to be reused for other membranes.

RESULTS

A. Flat Sheet Membrane

The retention characteristics for various salts and sugars of a flat sheet polyamide nanofiltration membrane (G-10 (GH; Osmonics) are shown in Table 9. The A-value of the membrane was 10.0, and the percent transmission of tap water was 62.8 (tested using 2000 ppm $MgSO_4$ at ambient temperature). The experiments were conducted at a temperature of 25–35° C. and a permeate flow rate of 5–8 mL/min.

TABLE 9

| Material | Concentration | Pressure (psi) | % Pass* pH 3 | pH 5** | pH 7 |
|---|---|---|---|---|---|
| $MnCl_2$ | 10 mM | 200 | 82.4 | 82.4 | 84.6 |
| $NaH_2PO_4$ | 10 mM | 200 | 33.0 | 18.0 | 10.5 |
| NaPyruvate | 10 mM | 200 | 49.4 | — | 8.9 |
| NaCl | 10 mM | 200 | — | — | 17.8 |
| Sialyl lactose*** | 10 g/L | 200 | <5 | — | <5 |

TABLE 9-continued

| Material | Concentration | Pressure (psi) | % Pass* pH 3 | pH 5** | pH 7 |
|---|---|---|---|---|---|
| Compound I*** | 10 g/L | 200 | — | — | 0 |
| Compound II*** | 2 g/L | 200 | 0 | — | — |
| LNT-2*** | 0.4 g/L | 200 | — | — | trace# |
| LNnT*** | 0.35 g/L | 200 | — | — | trace# |
| Lactose | 10 g/L | 200 | 2.0 | — | 4.2 |

*% Pass is the percent ratio of the amount of material in the permeate to the amount of material in the concentrate.
**"pH 5" ranged from 4.8 to 5.6
***Determined visually from TLC
"Trace" is defined as barely visible with TLC In another experiment, a G-10 (GH) polyamide membrane with an A-value of 8.0 and a percent transmission of tap water of 38.9 was tested. The experiment was conducted at 25–35° C. and a permeate flow rate of 6–8 mL/min. The results are shown in Table 10.

TABLE 10

| Material | Concentration | Pressure (psi) | % Pass* pH 3 | pH 5** | pH 7 |
|---|---|---|---|---|---|
| $MnCl_2$ | 10 mM | 200 | 70.8 | — | 77.7 |
| $NaH_2PO_4$ | 10 mM | 200 | 39.4 | 32.1 | 16.2 |
| NaPyruvate | 10 mM | 200 | 60.8 | — | 21.8 |
| NaCl | 10 mM | 200 | — | — | 14.2 |
| Sialyl lactose*** | 10 g/L | 200 | trace# | — | trace# |
| Compound I*** | 10 g/L | 200 | — | — | 0 |
| Compound II*** | 2 g/L | 200 | trace# | — | — |
| LNT-2*** | .4 g/L | 200 | — | — | trace# |
| LNnT*** | 0.35 g/L | 200 | — | — | trace# |
| Lactose | 10 g/L | 200 | 3.8 | — | 22.1 |

*% Pass is the percent ratio of the amount of material in the permeate to the amount of material in the concentrate.
**"pH 5" ranged from 4.8 to 5.6
***Determined visually from TLC A G-5 (GE) polyamide membrane (A-value: 3.9, percent transmission of tap water: 33.9) was also tested. The experiment was conducted at 25–35° C. and a permeate flow rate of 3–5 mL/min. Results are shown in Table 11.

TABLE 11

| Material | Concentration | Pressure (psi) | % Pass* pH 3 | pH 5** | pH 7 |
|---|---|---|---|---|---|
| $MnCl_2$ | 10 mM | 200 | 77.6 | 80.1 | 81.8 |
| $NaH_2PO_4$ | 10 mM | 200 | 30.0 | 8.6 | 4.8 |
| NaPyruvate | 10 mM | 200 | 48.2 | — | 8.4 |
| NaCl | 10 mM | 200 | — | — | 15.0 |
| Sialyl lactose*** | 10 g/L | 200 | 0 | — | 0 |
| Compound I*** | 10 g/L | 200 | — | — | 0 |
| Compound II*** | 2 g/L | 200 | 0 | — | — |
| LNT-2*** | 0.4 g/L | 200 | — | — | 0 |
| LNnT*** | 0.35 g/L | 200 | — | — | 0 |
| Lactose | 10 g/L | 200 | 6.3 | — | 15.1 |

*% Pass is the percent ratio of the amount of material in the permeate to the amount of material in the concentrate.
**"pH 5" ranged from 4.8 to 5.6
***Determined visually from TLC The sugar and salt retention characteristics of an HL (Osmonics) polyamide membrane are shown in Table 12. The experiments were carried out at 25–35° C. and a permeate flow rate of 8–13 mL/min.

TABLE 12

| Material | Concentration | Pressure (psi) | % Pass* pH 3 | % Pass* pH 5** | % Pass* pH 7 |
|---|---|---|---|---|---|
| MnCl$_2$ | 10 mM | 100 | 48 | 22 | 23 |
| NaH$_2$PO$_4$ | 10 mM | 100 | 67 | 24 | 7.5 |
| NaPyruvate | 10 mM | 100 | 76 | 29 | 16 |
| NaCl | 10 mM | 100 | 71 | 66 | — |
| Sialyl lactose*** | 10 g/L | 100 | 0 | — | 0 |
| Lactose | 10 g/L | 100 | 1.9 | 4.1 | — |

*% Pass is the percent ratio of the amount of material in the permeate to the amount of material in the concentrate.
**"pH 5" ranged from 4.5 to 5.8
***Determined visually from TLC B. Spiral Wound Membrane The characteristics of sugar and salt retention on several spiral wound polyamide membranes were also determined. A GH1812CZA membrane (Osmonics) was tested at a temperature of 25–35° C. and a permeate flow rate of 1.5–2 mL/sec. Results are shown in Table 13.

TABLE 13

| Material | Concentration | Pressure (psi) | % Pass* pH 3 | % Pass* pH 5** | % Pass* pH 7 |
|---|---|---|---|---|---|
| MnCl$_2$ | 10 mM | 100 | 93 | 94 | — |
| NaH$_2$PO$_4$ | 10 mM | 100 | 69 | 29 | 19 |
| NaPyruvate | 10 mM | 100 | 68 | — | 42 |
| NaCl | 10 mM | 100 | 66 | 61 | 64 |
| Sialyl lactose*** | 10 g/L | 100 | trace# | — | trace# |
| Compound I*** | 10 g/L | 100 | 0 | — | 0 |
| Compound II*** | 2 g/L | 100 | 0 | — | 0 |
| LNT-2*** | 0.4 g/L | 100 | trace# | — | trace# |
| Lactose | 10 g/L | 100 | 73 | — | 34 |
| GlcNAc | 10 g/L | 100 | 48 | — | 56 |
| Na$_4$P$_2$O$_7$ | 10 mM | 100 | 13 | — | 5.7 |
| Sialic Acid*** | 10 mM | 100 | 25–50 | — | — |
| Cytidine*** | 1 g/L | 100 | >50 | — | >50 |
| CMP*** | 1 g/L | 100 | >50 | — | >50 |
| Benzoic Acid | ~0.5 g/L | 100 | 90 | — | — |

*% Pass is the percent ratio of the amount of material in the permeate to the amount of material in the concentrate.
**"pH 5" ranged from 4.5 to 5.6   "pH 7" ranged from 6.1 to 7.4
***Determined visually from TLC
"trace" is defined as barely detectable on TLC by eye Results obtained for a GE1812CZA spiral wound polyamide membrane (Osmonics) tested at 25–35° C. and a decreased permeate flow rate of 0.9 mL/sec are shown in Table 14.

TABLE 14

| Material | Concentration | Pressure (psi) | % Pass* pH 3 | % Pass* pH 5** | % Pass* pH 7 |
|---|---|---|---|---|---|
| MnCl$_2$ | 10 mM | 100 | 90 | 94 | — |
| NaH$_2$PO$_4$ | 10 mM | 100 | 54 | 14 | 8.7 |
| NaOAc | 10 mM | 100 | 98 | — | 24 |
| NaPyruvate | 10 mM | 100 | 73 | — | 45 |
| NaCl | 10 mM | 100 | 54 | — | 44 |
| Sialyl lactose*** | 10 g/L | 100 | 0 | — | 0 |
| Compound I*** | 10 g/L | 100 | 0 | — | 0 |
| Compound II*** | 2 g/L | 100 | 0 | — | 0 |
| Lactose | 10 g/L | 100 | 41 | — | 43 |
| GlcNAc | 10 g/L | 100 | 72 | — | 69 |
| MgSO$_4$ | 10 mM | 100 | 50 | 37 | — |
| Na$_4$P$_2$O$_7$ | 10 mM | 100 | 11 | — | 4.7 |
| Sialic Acid*** | 10 mM | 100 | trace# | — | trace# |
| Cytidine*** | 1 g/L | 100 | >50 | — | >50 |
| CMP*** | 1 g/L | 100 | >50 | — | >50 |
| Benzoic Acid | ~0.5 g/L | 100 | 63 | 40 | — |

*% Pass is the percent ratio of the amount of material in the permeate to the amount of material in the concentrate.
**"pH 5" ranged from 4.8 to 5.6
***Determined visually from TLC
"Trace" is defined as barely visable with TLC These results demonstrate that the G-10 (GH) (A value=10) and the G-10 (GH) (A value=8) flat sheet membranes and the GH1812CZA spiral wound membrane allowed ions to pass but did not efficiently retain sialyl lactose or similar trisaccharides, The G-5 (GE) (A-value=3.9) flat sheet membrane and the GE1812CZA spiral wound membrane retained sialyl lactose as well as Compounds I and II, LNT-2, and LNnT, while allowing ionic compounds to pass.

All publications, patents and patent applications mentioned in this specification are herein incorporated by reference into the specification to the same extent as if each individual publication, patent or patent application was specifically and individually indicated to be incorporated herein by reference.

The above description is illustrative and not restrictive. Many variations of the invention will become apparent to those of skill in the art upon review of this disclosure. Merely by way of example a number of substrates, enzymes, and reaction conditions can be substituted into the glycosyl transferase cycles as part of the present invention without departing from the scope of the invention. The scope of the invention should, therefore, be determined not with reference to the above description, but instead should be determined with reference to the appended claims along with their full scope of equivalents.

What is claimed is:

1. A method of removing an unsialylated carbohydrate contaminant from a mixture comprising said contaminant and a sialyl galactoside, said method comprising contacting said mixture with a nanofiltration or reverse osmosis membrane at a pH of from about 1 to about 7, for a length of time sufficient to allow said unsialylated carbohydrate contaminant to pass through said membrane.

2. The method according to claim 1, wherein said sialyl galactoside is sialyl lactose.

3. The method according to claim 2, wherein said unsialylated carbohydrate contaminant is lactose.

4. A method of removing an unsialylated galactoside contaminant from a mixture comprising said contaminant and a sialyl galactoside, said method comprising:

(a) contacting said first mixture with a nanofiltration or reverse osmosis membrane at a first pH for a first time period, thereby dividing said mixture into a first permeate fraction having passed through the membrane and a first retentate fraction not having passed through the membrane;

(b) following step (a), contacting said first retentate fraction with a nanofiltration or reverse osmosis membrane at a second pH different from said first pH for a second time period, thereby dividing said first retentate fraction into a second permeate fraction having passed through the membrane and a second retentate fraction not having passed through the membrane, said second retentate fraction comprising purified sialyl galactoside.

5. The method according to claim 4, wherein said first pH is lower than said second pH.

6. The method according to claim 4, wherein said first pH is about 3.

7. The method according to claim 4, wherein said second pH is about 7.4.

8. The method according to claim 4, wherein said sialyl galactoside is sialyl lactose.

9. The method according to claim 4, wherein said unsialylated carbohydrate contaminant is lactose.

10. A method of synthesizing a sialylated oligosaccharide, said method comprising:

(a) forming a reaction mixture by contacting a glycosyl acceptor with a glycosyl donor and a glycosyl transferase capable of ligating said glycosyl donor to said glycosyl acceptor; and (b) contacting said reaction mixture with a nanofiltration or reverse osmosis membrane at a first pH for a first time period, thereby dividing said mixture into a first permeate fraction having passed through the membrane and a first retentate fraction not having passed through the membrane;

(c) following step (b), contacting said first retentate fraction with a nanofiltration or reverse osmosis membrane at a second pH different from said first pH for a second time period, thereby dividing said first retentate fraction into a second permeate fraction having passed through-the membrane and a second retentate fraction not having passed through the membrane, said second retentate fraction comprising substantially purified oligosaccharide.

11. The method according to claim 10, wherein said sialylated oligosaccharide is a sialylated galactoside.

* * * * *